United States Patent [19]

Wood

[11] 4,251,991
[45] Feb. 24, 1981

[54] BUOYANTLY SUPPORTABLE STRUCTURES ESPECIALLY FOR POWER GENERATING SYSTEMS

[75] Inventor: Eric Wood, Ossett, England

[73] Assignee: Sea Energy Associates, Limited, England

[21] Appl. No.: 935,988

[22] Filed: Aug. 22, 1978

[51] Int. Cl.³ ............................................. F03B 13/12
[52] U.S. Cl. ........................................ 60/398; 60/497; 60/500; 60/501
[58] Field of Search .................. 60/398, 495, 497, 500, 60/501, 505; 290/42, 43, 53, 54; 415/2, 7, 8; 417/330, 331, 332, 334, 337

[56] References Cited

U.S. PATENT DOCUMENTS

| | | | |
|---|---|---|---|
| 3,928,967 | 12/1975 | Salter | 60/398 |
| 4,048,512 | 9/1977 | Wood | 60/500 |
| 4,179,886 | 12/1979 | Tsubota | 60/497 X |

Primary Examiner—Allen M. Ostrager
Attorney, Agent, or Firm—Wolf, Greenfield & Sacks

[57] ABSTRACT

Apparatus for generating power from the motion of waves on a body of water utilizes a spine formed by buoyant sections that are joined end to end and are ballasted to cause the sections to assume a predetermined position in calm water. Adjacent sections are joined in a manner enabling the sections to pivot more easily about at least one non-vertical axis when the sections are in the predetermined position. Consequently, when the apparatus is subjected to wave motion the surge component of the wave motion is converted to vertical motion of the spine. Mounted on the spine are a number of prime movers that rock relative to the spine under the heave component of wave motion and under the vertical motion of the spine. The rocking motion of the prime movers is utilized to produce energy.

5 Claims, 10 Drawing Figures

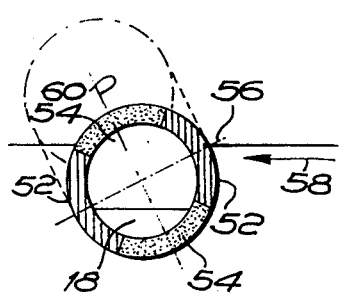
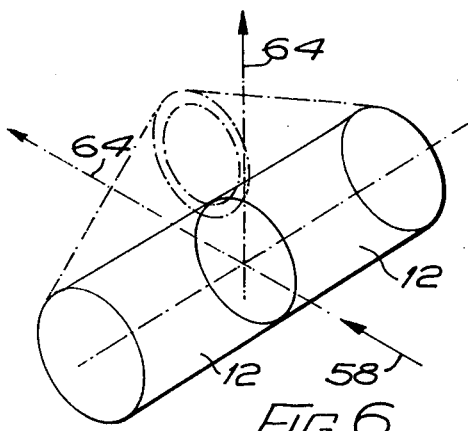
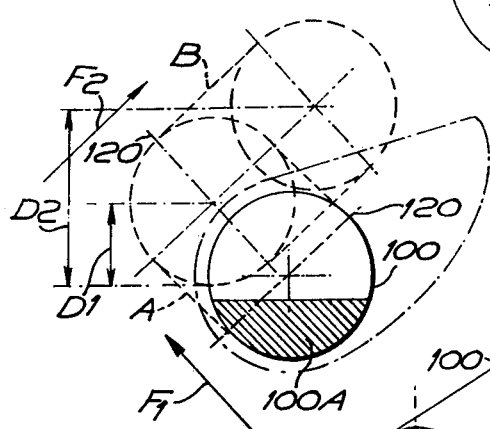
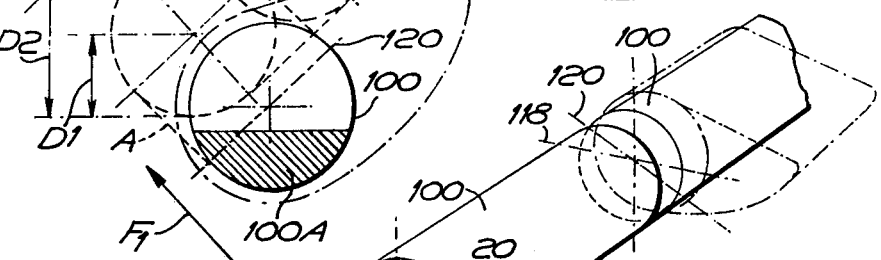
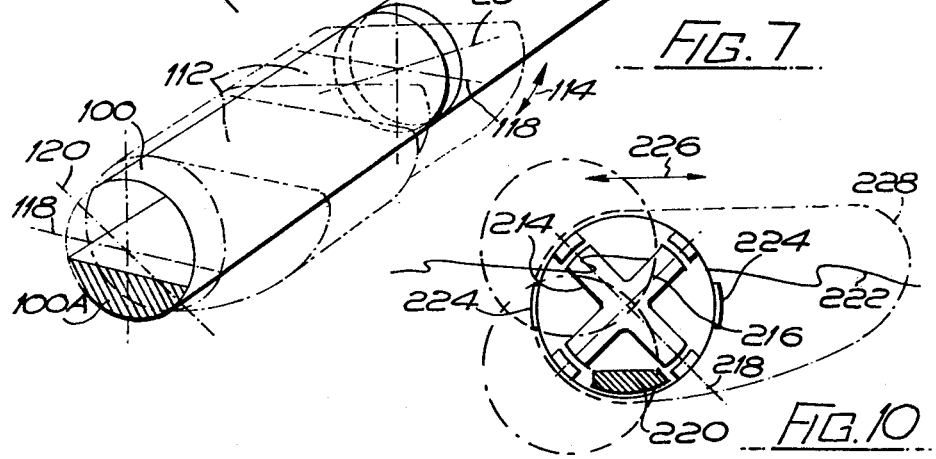
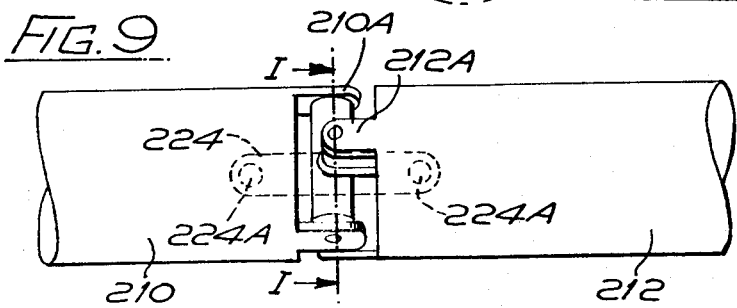

BUOYANTLY SUPPORTABLE STRUCTURES ESPECIALLY FOR POWER GENERATING SYSTEMS

This invention relates to buoyantly supportable structures especially for power generating systems, and in particular concerns a spine for a system for generating power from wave motions of the sea.

It is known to utilise a plurality of spine elements to define a spine for rockably supporting ducks for the generation of energy from the rocking movement of the ducks when the system is buoyantly supported at sea. These ducks are prime movers and have been so called because they have freedom only to rock about a defined axis and in so doing execute a bobbing motion from which the energy is derived. Where the expression "duck" is used in this specification such a prime mover is intended. Examples of constructions of such ducks are disclosed in U.S. Pat. No. 3,928,967.

At present, laboratory units using ducks have been built and tested, and generally speaking each such unit has a duck having a frontal lobe or nose portion which faces incoming waves and at the rear, the leeward side of the waves, the duck is shaped to have a minimum or zero displacement of water as the duck rocks. In the known arrangement described in said U.S. Pat. No. 3,928,967, the ducks are mounted on a spine which may be rigid or may be made up of spine elements pivotally interconnected. This arrangement is suggested in order that strains imparted to the spine will be reduced, whilst enabling the spine to be made longer. If a long rigid spine is used, the strains thereon may become intolerably high.

It is a requirement however that the spine, although made up of relatively tiltable elements, be relatively stable in order that the ducks will continue to be presented to the incoming waves in a satisfactory manner, and this invention is concerned with providing a spine which is inter alia for the application hereinbefore set forth and which is designed to enhance the operation of an energy generating system in which it is used, by absorbing energy imparted by the waves to the spine and for converting such energy into output energy which can be extracted from the system.

According to one aspect of the present invention, there is provided a spine for a power generation system which is for the generation of energy from the wave motions of the sea and which is buoyantly supported by the sea in use, comprising spine elements on which ducks or other prime movers are adapted to be movably, rockably or rotatably mounted, the spine elements, or at least some of the, being ballasted so that they will take up a predetermined position when buoyantly supported, the elements being interconnected by joints which allow and encourage the adjacent elements to pivot about an axis or axes which is or are other than vertical when the spine is in said position, so that when the spine comes under the influence of the wave forces in use, there will be a relative lifting and lowering of element ends and because of the said ballasting, the spine elements will tend to return to an initial predetermined position.

Said predetermined position is preferably a position in which the spine elements are aligned.

According to a preferred arrangement of the present invention at least some of said elements are interconnected by joint means having resilient packing material of different or varying relative elasticity so as to restrain tilting of the elements at said joint means more about an upright axis and less or not at all about a second axis which is transverse to said upright axis.

Preferably, the spine elements are ballasted so that when buoyantly supported by water, and in the predetermined position, the said resilient packing material is located so that said second axis, as regards the joint means is inclined upwardly and relative to wave directions, and said first axis is at right angles to said second axis.

The advantage of this arrangement is that if the spine when in use experiences surge forces which tend to tilt the spine elements relatively at said joint means back and forth horizontally, the restraining means resist this back and forth pivoting and the pivoting takes place upwardly and rearwardly. This means that the spine element ends at least are raised or lowered, which is an advantage as the raising or lowering of the spine elements or the ends thereof represents stored energy which can be transmitted to the ducks or other primary displacers when carried by the spine and can be recovered by suitable energy conversion means, when the spine elements return to their initial positions. The ballasting of the spine elements assists in returning to the elements to the said initial position. The initial position can be considered to be the position the spine takes up when in calm water.

The restraining means may comprise rubber or the like blocks positioned between interfitting castellated ends of adjacent elements, and tension cables may hold the spine elements together.

In an alternative arrangement, the joints between elements are universal joints and the said restraining means may be rubber straps.

In an energy generating system including the spine and ducks, there will be energy generating means, such as pumps, electrical generating means and/or mechanical transmission whereby energy output is generated when there is relative rocking or rotation movement between the ducks and spine elements on which they are mounted.

When the wave forces are insufficient to effect relative tilting between the spine elements, such wave forces may still rock the ducks in the manner set out in said U.S. Pat. No.

The invention also provides an energy generating system as aforesaid, and electrical energy produced by such a system, when adapted to give electrical energy output.

Embodiments of the present invention will now be described, by way of example with reference to the accompanying diagrammatic drawings, wherein:

FIG. 5 is a side view showing how the spine elements react to surge forces;

FIG. 6 is a perspective view illustrating the effect in FIG. 5;

FIG. 7 is a diagrammatic perspective view showing a portion of a spine according to another embodiment of the invention, the spine being shown as having several ducks rockable thereon;

FIG. 8 is a diagrammatic sectional elevation of the spine portion shown in FIG. 7 this figure also showing an example of how several of the elements of the spine might deflect in use; and FIGS. 9 and 10 respectively are a side view and sectional end view of a joint of a spine according to another embodiment of the invention.

Figure 1:
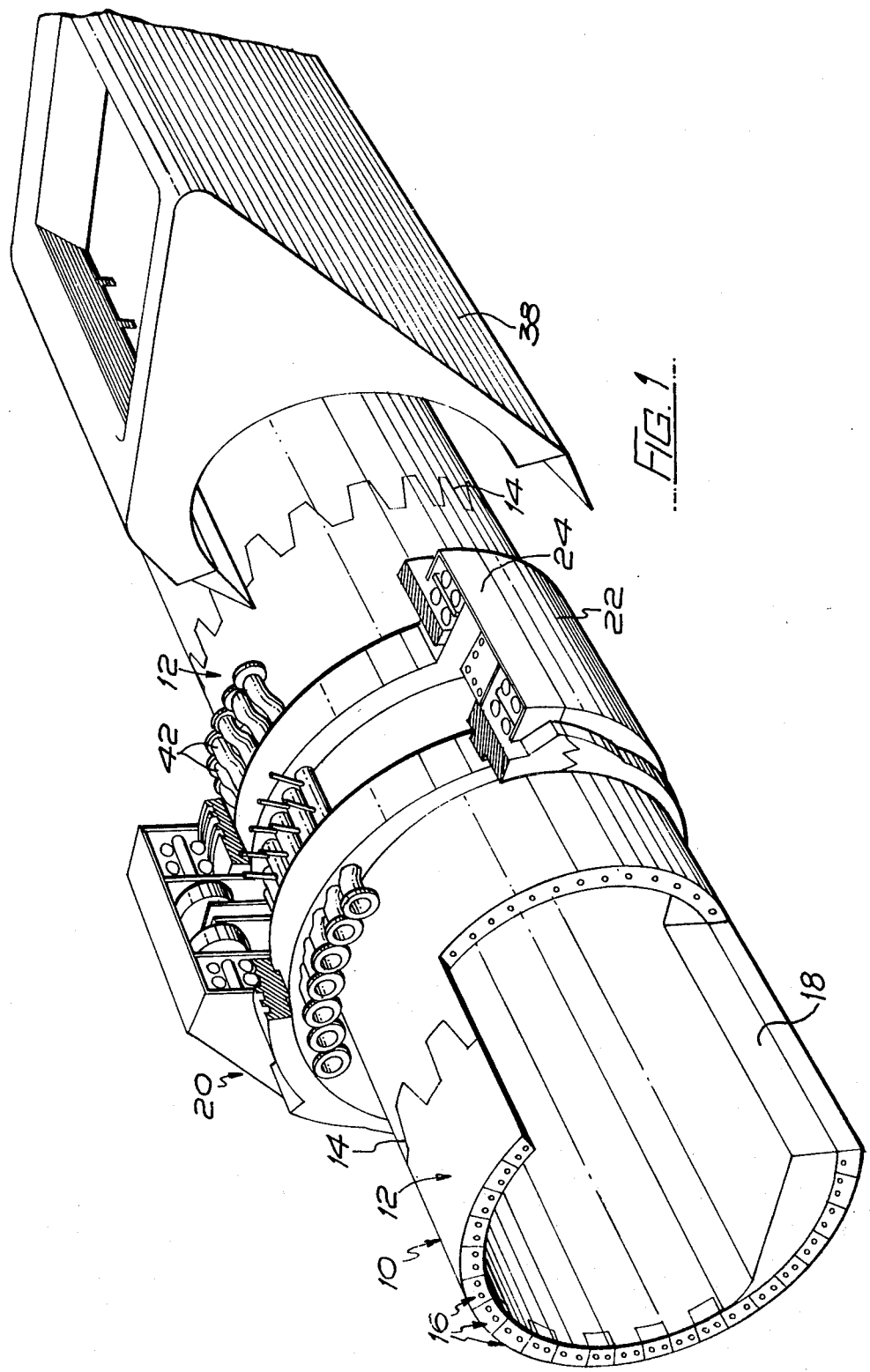
FIG. 1 is a cut away perspective view showing part of a spine of apparatus according to the invention.

Referring to the drawings, in FIG. 1 there is shown apparatus according to the invention for use in the generation of useful energy from the energy in waves in a body of liquid, such as the sea or the ocean. The apparatus which is a buoyant structure comprises a longitudinal spine 10 made up of a number of spine elements 12 which are not quite cylindrical, as will be explained hereinafter, but which approach cylindrical shape. The elements 12 are provided with castellated ends 14 as shown and the castellations of the ends of adjacent elements 12 interfit as shown in FIG. 1. Each element 12 is drilled axially through its wall region as indicated by reference numeral 16, and through these drillings are tension cables which serve to urge the elements 12 together. Furthermore, in the bottom region in FIG. 1 of each of the elements 12 there is provided ballasting 18, in order to keep the elements and the spine in a particular disposition.

At a number of locations spaced lengthwise of the spine there are power modules, of which one is shown in FIG. 1 the module being indicated generally by the numeral 20. The module essentially is in two half shell portions 22 and 24 which are clamped together around the spine and the internal shape of the bore defined by the two shells 24 matches the outer peripheral shape of the spine so that the module 20 cannot rotate about the spine.

Figure 3:
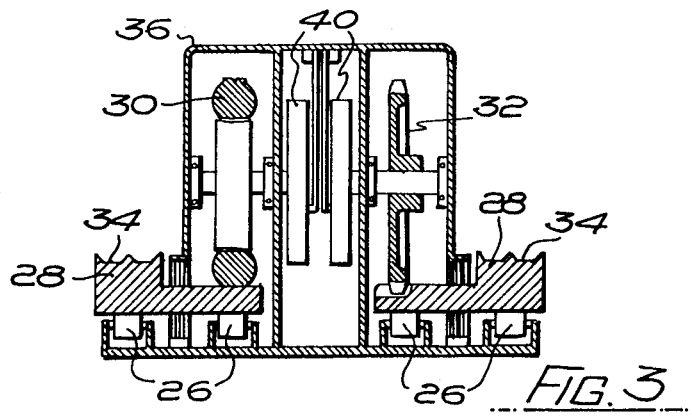
FIG. 3 is a longitudinal sectional view showing the drive to the power module.

As best shown in FIG. 3, the shells 22 and 24 are provided with track idler rollers 26 so as to rotatably support torque rings 28 and said torque rings also engage drive members 30 and 32. The member 30 shown in FIG. 3 is in fact a rubber tire drive, and 32 is an alternative drive arrangement in the form of a gear wheel or sprocket having a teeth which mesh with teeth on the associated torque ring 28. Bearing surfaces 34 of the torque rings lie outside the side faces of the housing 36 of the module 24 and serve to receive duck lobes 38 (FIG. 1) the arrangement being that each duck lobe 38 is supported between a pair of adjacent modules 24 by being supported on and secured to adjacent torque rings 28. It will be appreciated that by so mouting the duck lobe 38, it is free to rotate with the torque rings 28 to which it is secured.

Figure 2:
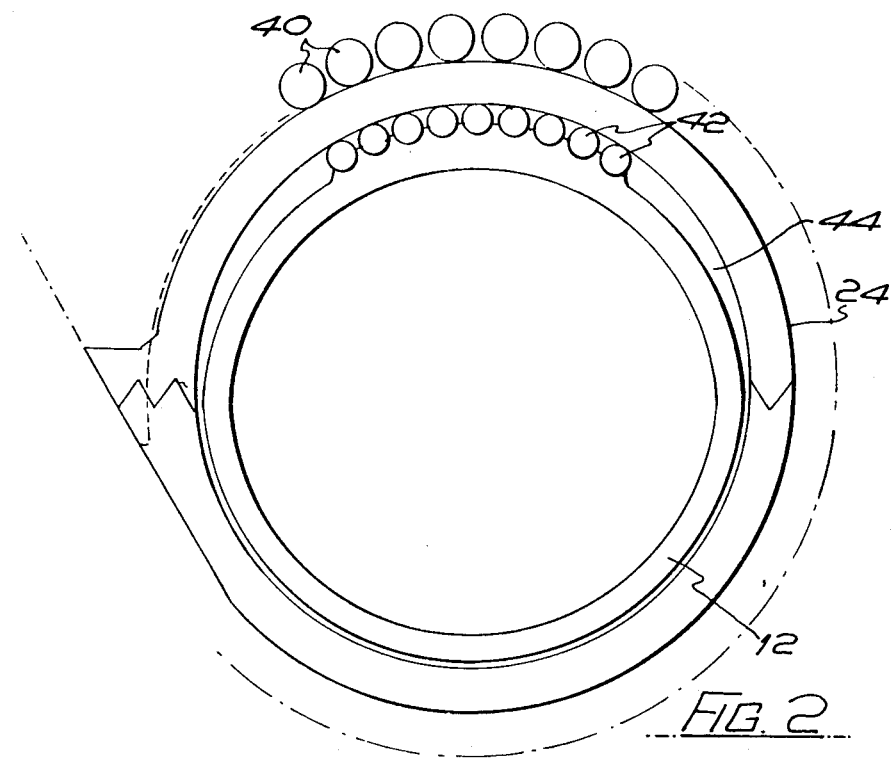
FIG. 2 is a cross-sectional view showing the elliptic form of the spine element in relation to the circular form of the power module shell and the location of the distribution pipes in the space between those forms.

Reverting once more to FIG. 3, each of the drive members 30 and 32 is connected to a pump unit 40 which pumps liquid, suitably the same liquid as that in which the apparatus is buoyantly supported, into distribution pipes 42 carried by the module 20. If reference is made to FIG. 2 it will be seen that the distribution pipes 42 (high pressure and low pressure) are located at the underside of the shell 24, but clear of the adjacent surface of the spine 10. This is achieved by making the spine elements 12 somewhat out of circular in order to create a crescent shaped space 44 in which the pipes 42 can be located.

It is to be pointed out that each power module includes a plurality of the pump units 40 as shown clearly in FIG. 3, each respectively connected to one of the distribution pipes 42.

In a complete installation, there will be a plurality of the modules 20 and a plurality of the duck lobes 38 with connected torque rings 28, and when the apparatus is arranged in the body of liquid and is acted upon by waves therein, the duck lobes 38 will be caused to rock or bob in sympathy with the wave forces, and this rocking or bobbing motion is converted into pressure energy by the pumps 40. The advantage of this arrangement is that the module 20 is readily separable from the spines 10 for repair and/or replacement. The respective pipes 42 of the modules will of course be interconnected by suitable flexible connecting pipes.

The wave forces which the spine 10 will experience in use may be regular or random depending upon the prevailing conditions, but basically a wave impinging upon the apparatus applies both heave and surge forces on the apparatus. These forces are cyclic, and the heave force tends to lift the apparatus whilst the surge force tends to move it horizontally back and forth. It is desirable that the spine should have some capability of flexing under these forces, especially if they are of a very high nature as might occur in very heavy seas, so that the spine is not subjected to undue bending moments.

Figure 4:
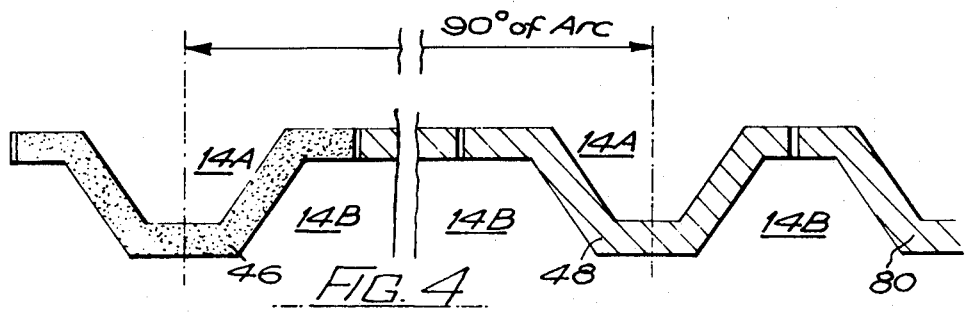
FIG. 4 is a developed view of parts of a joint between spine elements of the spine of FIG. 1.

The spine as illustrated in FIG. 1 is designed for a predetermined type of flexing to ensure that the natural tendency of the spine to flex will be accompanied by relative but limited tilting of adjacent spine sections 12 which tend to lift the joint defining the connections between such adjacent sections. To this end, between the castellations 14 at each of the joints between the elements 12 are blocks of rubber or other resilient material of appropriate profile. Thus, if reference is made to FIG. 4 a number of blocks of rubber 46, 48, 50 are shown as being located between the castellations 14A of one of the elements 12 and the castellations 14B which are of another element 12 and which interfit with the castellations 14A. The portion to the left of FIG. 4 shows the joint at a 90° of arc spaced location relative to the portion shown in the right hand figure, because the blocks of rubber 48 and 50 are designed to be much stiffer than those, such as 46, at 90° spaced locations. The blocks 48 and 50 have a much higher degree of resistance to compression than the more soft blocks 46. By arranging the blocks stiff/soft, alternating at 90° locations, the direction in which the spine elements will tend to tilt relatively under the surge and heave forces can be predetermined.

If reference is now made to FIG. 5, in this view areas of stiff rubber are indicated by numeral 52, whilst the regions of soft rubber are indicated by numeral 54. It will be seen that each is illustrated as taking up a quadrant of an annulus. The quadrants are arranged in relation to the ballasting 18 so that the two sections of stiff rubber 52 define an axis 56 which may be for example inclined at an angle of 30° to the horizontal and in an upwards direction facing the direction 58 on which the waves fall on the spine, whilst the other two blocks 54 define an axis 60 which is at right angles to the axis 56. The effect of arranging the resilient material in this manner is that if a surge force is applied to the spine as indicated by arrow 58, there will be a tendency for the adjacent spine elements connected by the appropriate joint to tilt, but tilting about the axis 60 will be more strongly resisted by the regions of stiffer resilient material than about the axis 56 with the result that the elements will tend to tilt more about axis 56 and lift in the manner indicated in dotted lines in FIG. 5, and also in FIG. 6. This is the effect of storing potential energy in the elements due to the lifting of the ends and this potential energy can be released through the duck lobes 38 when the elements return to the initial position when the wave force is removed. Thus, surge forces are at least partially converted into useful energy by so arranging the joints of the spine.

In FIG. 6, the two elements 12 connected by the joint shown in FIG. 5 are illustrated diagrammatically and in perspective view. The wave force direction 58 is shown and the vertical and horizontal are indicated by lines 62 and 64.

The variation in the stiffness of the resilient material around the circumference of the joint can be selected to give the desired effect. For example the effect may be achieved by using blocks of two different stiffnesses, or from the stiffest to the softest block, there may be a gradual variation in stiffness around each arc of 90°.

The making of the spine elements in the out of circular section also has the effect of defining an axis (horizontal) about which the sections will tilt in the same manner as described above, and in a very simplified embodiment the resilient blocks may be omitted.

Referring now to FIGS. 7 and 8 of the drawings, in FIG. 7 there is shown a portion of the spine made up of a number of elements such as spine elements 100, each of which may be of any desired structure such as that shown in FIG. 1, but which are shown as plain cylinders for simplicity of illustration. Each element 100 is adapted to rockably to support a number of side-by-side ducks 112 thereon, so that each duck 112 can rock or bob as indicated by arrow 114 in FIG. 7. Each duck 112 is provided with a cylindrical bore in which the spine 100 is located, and the duck 112 is suitably supported for rocking movement. Such rocking movement results in rotation of rolling elements and this rotation is converted into electrical power, for example by the means referred to in relation to FIGS. 1 to 6.

In FIG. 8 the spine element 100 is shown in full lines in the position it will occupy when buoyantly supported on calm water and, the lower half of the spine element 100 is ballasted as at 100A so that the lower half of the spine element 100 will be heavier than the top half, and the spine element, following displacement when in use, will tend to return to the position shown.

The adjacent spine elements 100 are interconnected by pivotal joints, which are in this example hook type joints, except that instead of the two axes of pivoting of the hook joint being at right angles, they are disposed at an acute angle one relative to the other. The angle may be for example in the region of 30°-60°. One of the axis at each joint is arranged to be horizontal when the spine is in use, the other being arranged at an angle to the horizontal. This has the effect of ensuring that when a spine element pivots relative its neighbours, the adjacent ends will either be lifted or lowered vertically about the horizontal axes of the hook joints, or the ends will be raised or lowered in a plane which is at an angle to the horizontal plane containing the horizontal axes, or there will be a combination of these movements. In any event, relative pivoting between the spine elements which inevitably will take place during use of the spine results in the spine elements, or the ends thereof being raised and lowered, and the spine elements 100 may well be displaced about their longitudinal axes rotatably so that the ballasted half of the spine element will swing or rock like a pendulum. This effect takes place especially when the spine as a whole lies at an angle to the direction of propagation of the waves in the water. It is advantageous that the spine elements should lift and lower under the wave action, because the spine elements in themselves constitute a source of potential energy when raised, and this energy is released through the driving of the ducks, and hence the conversion of the energy into electrical power, and the spine is more efficient because of this effect.

Of the actual hook joint arrangements which are used to interconnect the respective spine elements, in FIG. 7 the axes of typical joints are shown and the horizontal axes are indicated by numeral 118, whilst the inclined axes are indicated by numeral 120. The yoke of the joint may include rubber transmission means, so that when the joint is put under stress the rubber will be placed in torsion.

It will be noticed in FIG. 7 that the inclination of the axes 120 alternate along the spine length. This ensures that when the forces on the spine are sufficient, there will be relative tilting between the elements in what might be called a "three dimensional" manner, and the relative tilted positions of the elements will probably be continuously changing as it is established that wave forces are cyclic. In any event, the ballasting 100A which is preferably provided in each spine element, will act to return the elements to the initial aligned calm water position. In return movement of a spine element to this initial position from a raised position, which constitutes an energy stored position, will cause a reaction between the ducks 12 on such element and the water effecting relative rotation between the ducks and spine elements. This relative rotation can be converted by the transmission means into output energy which can be extracted from the system.

FIG. 8 shows in dotted lines, how two elements may be tilted relative to the initial calm water position shown in full lines. The two elements are indicated by numerals A and B respectively. These elements are assumed to be connected on a spine comprising a plurality of such elements and the displacements to be described can be considered to be typical of the type of displacements which take place throughout the length of the spine.

In FIG. 8, wave forces F1 and F2 are assumed to exist and to act on the elements A and B causing upwards and rearwards displacement of the further end of element A relative to the nearer end so that it is raised by the amount D1 relative to the calm water position, and the adjacent element B, has its further end upwardly and forwardly displaced relative to its nearer end as shown so that in fact such further end is raised by an amount D2 relative to the calm water position. As the wave forces are cyclic, and as the elements of the spine are ballasted as at 100a, the elements tend to return to the initial calm water position and in so doing give up the stored energy by virtue of being raised by the waves as described through causing relative rotation of the ducks 112 on the spine, and such relative rotation is converted into output energy by the transmission means. The special coupling of the elements therefore has advantageous effect.

It is to be appreciated that mixed wave forces will in fact act on the spine and the relative tilting movements will be complex and varied, when the apparatus is in use at sea, and FIG. 8 gives only an indication of a possible situation at one instant in time.

Preferably, the inclined axes of consecutive joints in the spine are inclined in opposite directions. This arrangement, coupled with the ballasting of the spine elements, gives the spine a strong tendency to resist forces tending to distort the spine from the aligned disposition, and when distorted the spine will have a strong tendency to return to the aligned disposition.

It is not necessary that each joint should have two mutually inclined pivot axes. There may be a single pivot axis which could be horizontal or inclined to the horizontal, as long as it is not vertical. Where the said single axes are inclined to the horizontal, it is preferred that consecutive axes along the length of the spine are inclined equally but in opposite directions.

FIGS. 9 and 10 show another example of a joint which may be provided between adjacent spine elements. Essentially, two spine elements 210 and 212 are connected by a universal type joint giving the section 210 and 212 an infinite number of degrees of freedom to tilt one relative to the other. The type of universal joint shown is the cruciform type having a yoke 214 defining two pivot axes 16 and 18 (see FIG. 2), the yoke being operatively mounted between lugs 210A and 212A at the ends of the respective spine elements 210 and 212 which are interconnected.

Additionally, the joint is provided with a restraining means which restrains relative pivoting of the elements 210 and 212 in a particular direction. To explain the arrangement of the illustrated embodiment, it is first to be mentioned that in this embodiment the elements 210 and 212 are ballasted by means of ballast weight 220 along an axially off-set region thereof. In the example, the ballast 220 is arranged so that when the spine is buoyantly supported in a body of water 222 and the ballast weight understandably positions the spine elements 210 and 212 such that the weight 220 takes up a position along the bottom of the spine. In this position, the axis 216 and 218 are shown lie at 90° to one another but at 45° to the vertical to the vertical, but inclined in opposite directions.

This disposition is desirable for the particular form of restraining means which we prefer to use in this embodiment of the invention.

The restraining means in fact comprises tension strap arrangement 224 tensioning the elements 210 and 212 axially together on opposite sides of the centre of intersection of the axes 216 and 218, and in a common horizontal plane when the spine is buoyantly supported by the water 222.

It is important that the restraining means be located so as to restrain the spine elements 210 and 212 from relative pivoting in a horizontal plane when in use. Pivoting in a horizontal plane can be considered as caused by surge forces in the wave motions, whilst relative pivoting in a vertical plane can be considered to be caused by heave forces in the body of water.

As explained herein, if the spine elements 210 and 212 are subjected to heave forces so that they are raised and/or lowered during use of the structure for the generating of energy, then increased output can be obtained. The restraining means 224 in the example described achieves this.

Thus, when the joint of the arrangement illustrated in FIGS. 9 and 10 experiences a surge force such as is indicated by the double headed arrow 226 in FIG. 10 the elements 210 and 212 tend to pivot about the illustrated joint in a horizontal plane. The restraining means 224 act to resist this, regardless of the direction in which the elements relatively pivot, and because the joint is less or not restrained from pivoting in a vertical plane, even with the application of a surge force 226 on the joint, the ends at least of the elements 210 and 212 will tend to lift or lower as shown in dotted lines in FIG. 10 and when the surge force which is cyclic force, is removed, the spine elements will again return to the initial position, especially under the influence of the ballasting 220, and during this return movement the ducks, such as duck 228 illustrated in FIG. 10 will tend to rock more relative to the spine elements, giving increased power output through appropriate energy conversion means.

Other forms of universal jointing between the elements can be adopted. For example ball and socket joints can work equally well.

The restraining means 224 illustrated in FIGS. 9 and 10 of the drawings may comprise a parafil rope tensioned around studs 224A on the elements 210 and 212, or other forms of restraining arrangements may be used.

What we claim is:

1. Apparatus for generating power from the motion of waves on a body of water, the apparatus comprising
   (1) a spine formed by a plurality of sections, the spine sections being buoyant and being ballasted to cause the sections to assume a predetermined position in calm water,
   (2) means joining the sections end to end to form the spine, the joining means enabling adjacent spine sections to pivot more easily about at least one non-vertical axis when the sections are in the aforesaid predetermined position whereby the surge component of wave motion is converted to vertical motion of the spine,
   (3) a plurality of prime movers, and
   (4) means mounting the prime movers on the spine, the mounting means enabling the prime movers to rock relative to the spine under the heave component of wave motion and under the vertical motion of the spine.

2. Apparatus according to claim 1 for generating power from the motion of waves on a body of water, wherein
   (i) adjacent sections of the spine have castellated interfitting ends, and
   (ii) the means joining the sections end to end include resilient members positioned between the castellated interfittings ends, the resilient members being arranged to enable adjacent sections to pivot more easily about said at least one non-vertical axis.

3. Apparatus according to claim 2 for generating power from the motion of waves on a body of water, wherein
   the means joining the sections end to end further include tension cables extending between adjacent sections and holding the sections together.

4. Apparatus according to claim 1 for generating power from the motion of waves on a body of water, wherein
   the means joining the sections end to end to form the spine are universal joints disposed between adjacent sections, the joining means further including resilient straps arranged to enable adjacent sections to pivot more easily about said at least one non-vertical axis.

5. Apparatus according to claim 1, wherein the prime movers are ducks.

* * * * *